US012533539B2

(12) United States Patent
Delapaz et al.

(10) Patent No.: US 12,533,539 B2
(45) Date of Patent: Jan. 27, 2026

(54) BATTERY FIRE CONTROL

(71) Applicant: Microsoft Technology Licensing, LLC, Redmond, WA (US)

(72) Inventors: Jose Seah Delapaz, Mill Creek, WA (US); Richard Donald Hage, Duvall, WA (US); Sarah Hisham Eldin, Los Angeles, CA (US); Nathan Andrew Ellis, Snohomish, WA (US); Paul Andrew Churnock, O'fallon, IL (US); Sean Patrick Abbott, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 884 days.

(21) Appl. No.: 17/566,423

(22) Filed: Dec. 30, 2021

(65) Prior Publication Data
US 2023/0211195 A1     Jul. 6, 2023

(51) Int. Cl.
*A62C 3/16*      (2006.01)
*A62C 37/36*     (2006.01)
*H01M 50/204*    (2021.01)

(52) U.S. Cl.
CPC ............... *A62C 3/16* (2013.01); *A62C 37/36* (2013.01); *H01M 50/204* (2021.01); *H01M 2200/10* (2013.01)

(58) Field of Classification Search
CPC .. A62C 3/16; A62C 3/06; A62C 37/36; A62C 37/12; A62C 3/00; A62C 3/07;

(Continued)

(56) References Cited

U.S. PATENT DOCUMENTS 1,032,351 A * 7/1912 Easton ................. A62C 35/605
                                                      169/26
3,209,837 A  10/1965 Freedman
(Continued)

FOREIGN PATENT DOCUMENTS

CN       106924914 A     7/2017
CN       107681067 A     2/2018
(Continued)

OTHER PUBLICATIONS

"International Search Report and Written Opinion Issued in PCT Application No. PCT/US2022/047956", Mailed Date: Apr. 17, 2023, 10 Pages.

*Primary Examiner* — Christopher R Dandridge
(74) *Attorney, Agent, or Firm* — Rainier Patents, P.S.

(57) ABSTRACT

The description relates to battery safety and more specifically to containing battery fires. One example can include displacement sub-systems configured to physically separate an affected battery pack from other battery packs. Another example can include a 3D deployable fire curtain configured to automatically deploy around a battery pack to limit the spread of fire between battery packs. A further example can include a media reservoir positioned over a battery pack that is configured to hold non-combustible smothering media. A media retainer can be interposed between the battery pack and the media reservoir and configured to automatically release the non-combustible smothering media into the battery pack support structure when the battery pack experiences a fire.

20 Claims, 15 Drawing Sheets

(58) Field of Classification Search
CPC . A62C 99/00; A62C 99/0009; A62C 99/0045; A62C 35/02
See application file for complete search history.

(56) References Cited

U.S. PATENT DOCUMENTS

| | | | |
|---|---|---|---|
| 2015/0069068 A1* | 3/2015 | Hariram | H01M 50/271 220/560.01 |
| 2017/0365824 A1 | 12/2017 | Berger et al. | |
| 2020/0147423 A1 | 5/2020 | Paull et al. | |
| 2021/0205643 A1 | 7/2021 | Yang et al. | |

FOREIGN PATENT DOCUMENTS

| | | | | |
|---|---|---|---|---|
| CN | 113518522 | * | 10/2021 | A62C 3/16 |
| WO | 2015158042 A1 | | 10/2015 | |

* cited by examiner

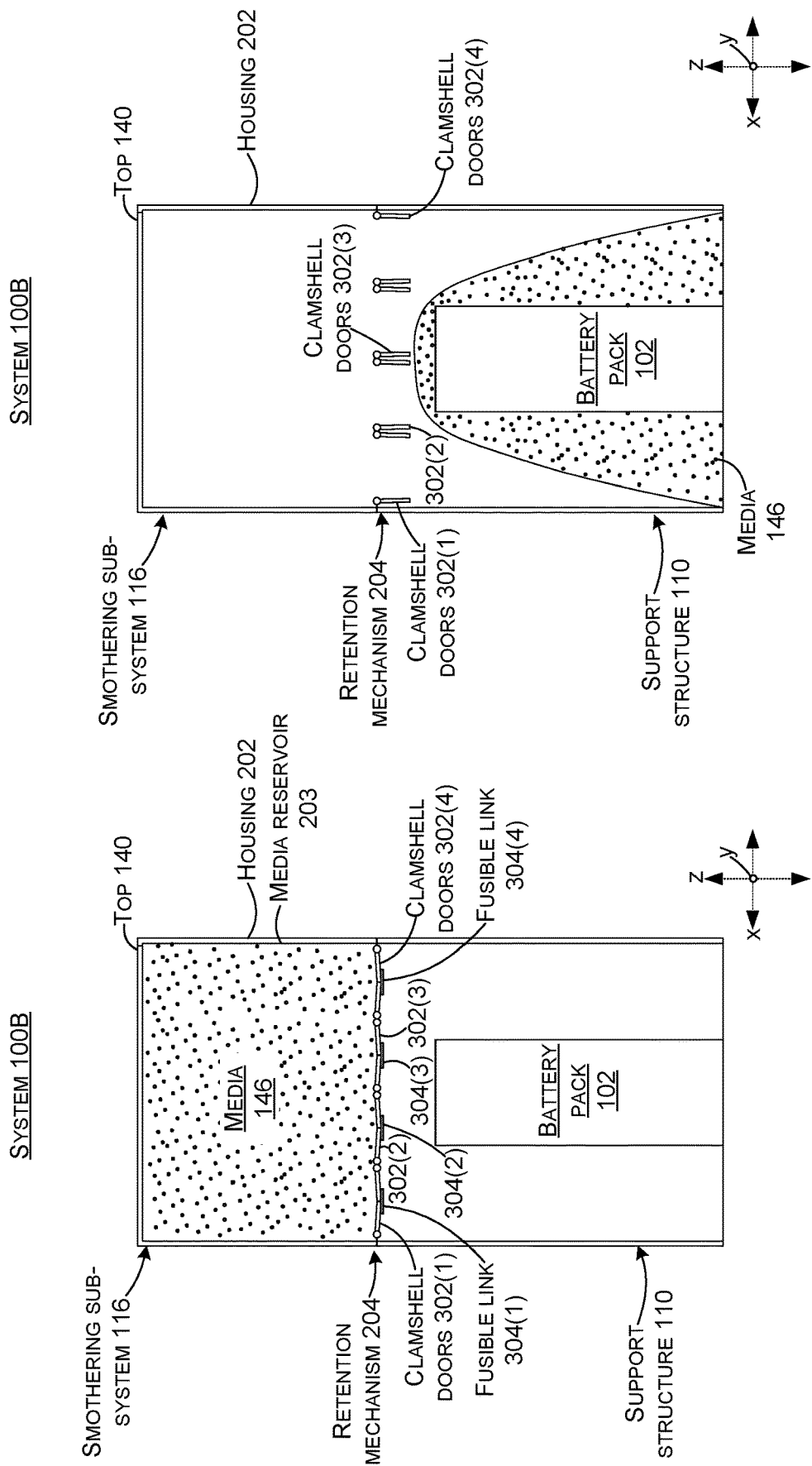

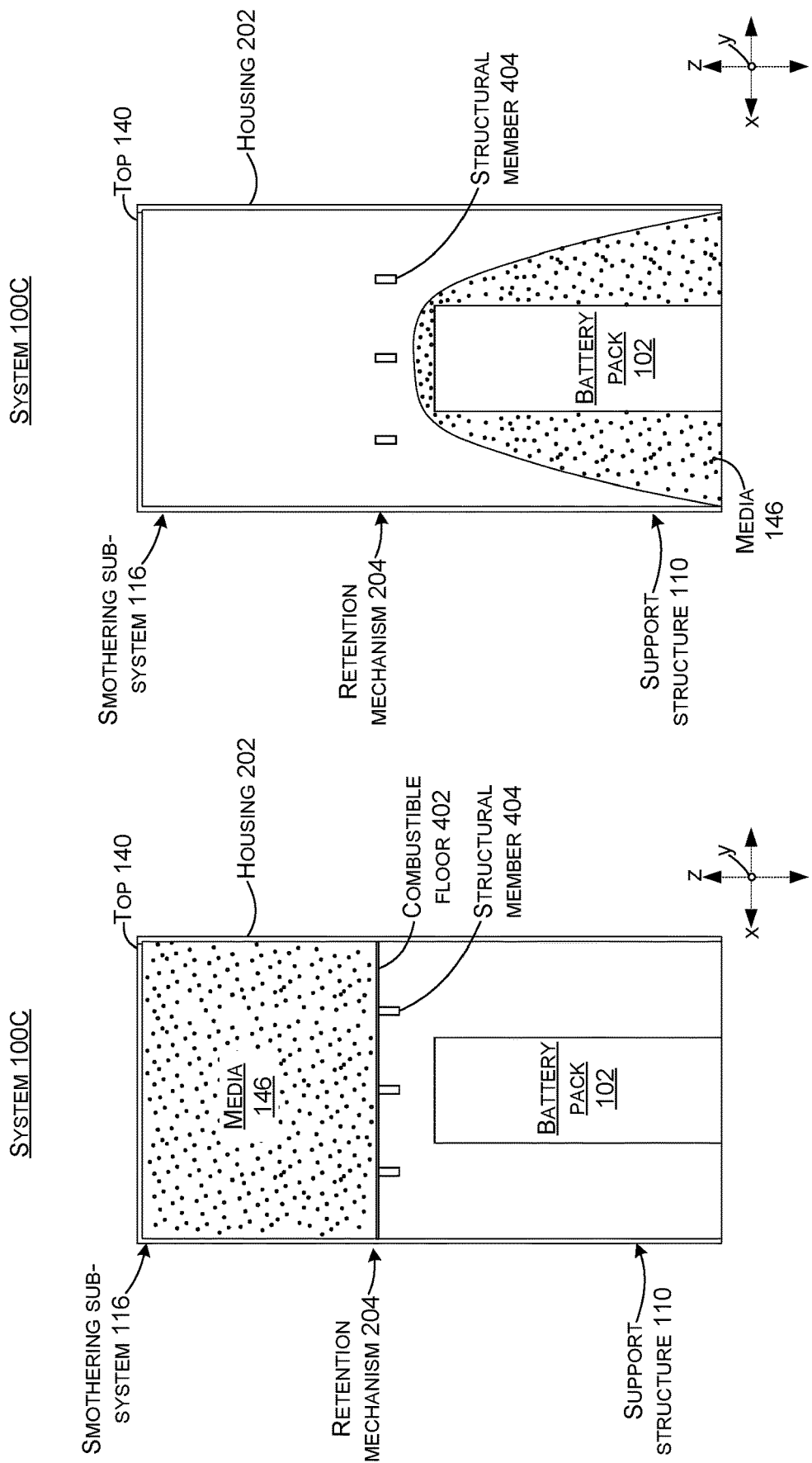

BATTERY FIRE CONTROL

BACKGROUND

Battery packs, such as Lithium-Ion battery packs, are seen as a backup power option for industrial facilities such as data center campuses. One of the risks involved with the inclusion of battery packs on datacenter campuses, or other industrial facilities, is the potential for a fire that is inextinguishable with typical methods. The use of water can result in an explosion that produces steam vapor. This vapor is extremely toxic and can include heavy metals. When inhaled, these vapors have harmful effects on sensitive sinus and lung tissue. The present concepts can address these and/or other issues.

SUMMARY

This patent relates to battery safety and more specifically to containing battery fires. One example can include displacement sub-systems configured to physically separate an affected battery pack away from other battery packs. Another example can include a three-dimensional (3D) deployable fire curtain configured to automatically deploy around a battery pack to limit the spread of fire between battery packs. A further example can include a media reservoir positioned over a battery pack that is configured to hold non-combustible smothering media. A media retainer can be interposed between the battery pack and the media reservoir and be configured to automatically release the non-combustible smothering media into the battery pack support structure when the battery pack experiences a fire.

This example is intended to provide a summary of some of the described concepts and is not intended to be inclusive or limiting.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced. Where space permits, elements and their associated reference numbers are both shown on the drawing page for the reader's convenience. Otherwise, only the reference numbers are shown. Note that some figures illustrate many elements/components and adding lead lines to all of the elements/components can diminish readability of the figure. Accordingly, not every element is designated in every figure.

FIGS. 3A, 3B, 4A, and 4B show elevational views of example systems in accordance with some implementations of the present concepts.

DESCRIPTION

Figure 1A:
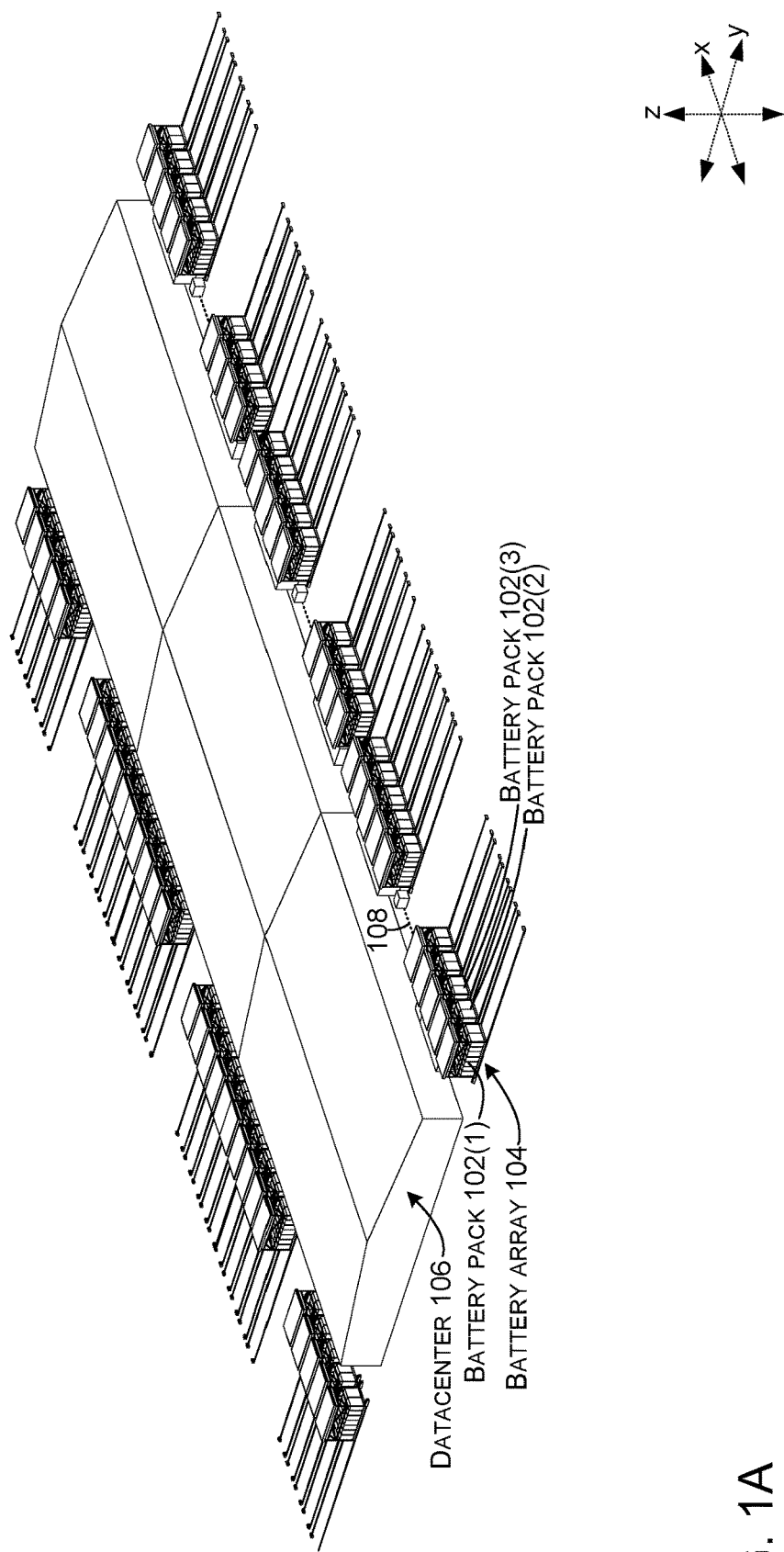
FIGS. 1A-1H, 2A-2C, 5A, and 5B show perspective views of example systems in accordance with some implementations of the present concepts.

The present concepts can help to reduce the impact and spread of a potential battery pack fire. Battery pack fires tend to be difficult and dangerous to extinguish. Accordingly, fire departments may choose to let them burn rather than risk firefighter injury. This approach, while justified, tends to result in destruction of all of the battery packs and potentially the entire facility. The present concepts relate to complementary fire spread reduction systems that can reduce fire growth relative to an individual battery pack and/or fire spread between battery packs.

Introductory FIGS. 1A-1H collectively show an example system 100 that can include battery packs 102. The battery packs can be associated in close physical proximity to one another as a battery array 104 (e.g., group of battery packs). The battery array 104 may also be in close proximity to other structures, such as a datacenter 106 or other facility structures. The battery array 104 can store and/or supply electrical power to an electrical network 108 (shown in ghost to indicate the network is underground) to function as a battery storage power station. The electrical power can be used locally, such as in datacenter 106 and/or generally over the electrical grid.

In the present implementation, the battery packs 102 can be positioned in battery pack support structures 110 (hereinafter, "support structures"). Though sizes vary, battery packs 102 tend to be relatively large. For instance, in some configurations, the battery packs can be similar in size to commercial shipping containers. Other sizes can also be employed. The size and weight can make it difficult to move the battery packs even under normal conditions. Further, battery fires tend to be difficult to extinguish and tend to release hazardous compounds. As a result, firefighting tactics tend to involve establishing a perimeter and letting the fire burn itself out. This strategy tends to result in destruction of many or all of the battery packs 102 of the battery array 104 and/or any adjacent structures, such as datacenters, networks, etc.

The present concepts offer multiple complementary technical solutions that reduce fire damage associated with battery packs 102 of battery arrays 104. A first aspect can involve automatically physically displacing or moving a burning or otherwise distressed battery pack away from the other battery packs. A second aspect can involve automatically deploying a fireproof shroud around the battery pack to prevent fire spread to and/or from adjacent battery packs. A third aspect can involve automatically deploying large amounts of non-combustible smothering media on the burning battery pack to smother or otherwise extinguish/contain the fire. Any or all of these aspects can be employed to reduce the destruction resulting from battery pack fires. Example components for achieving these aspects are described below.

Figure 1B:
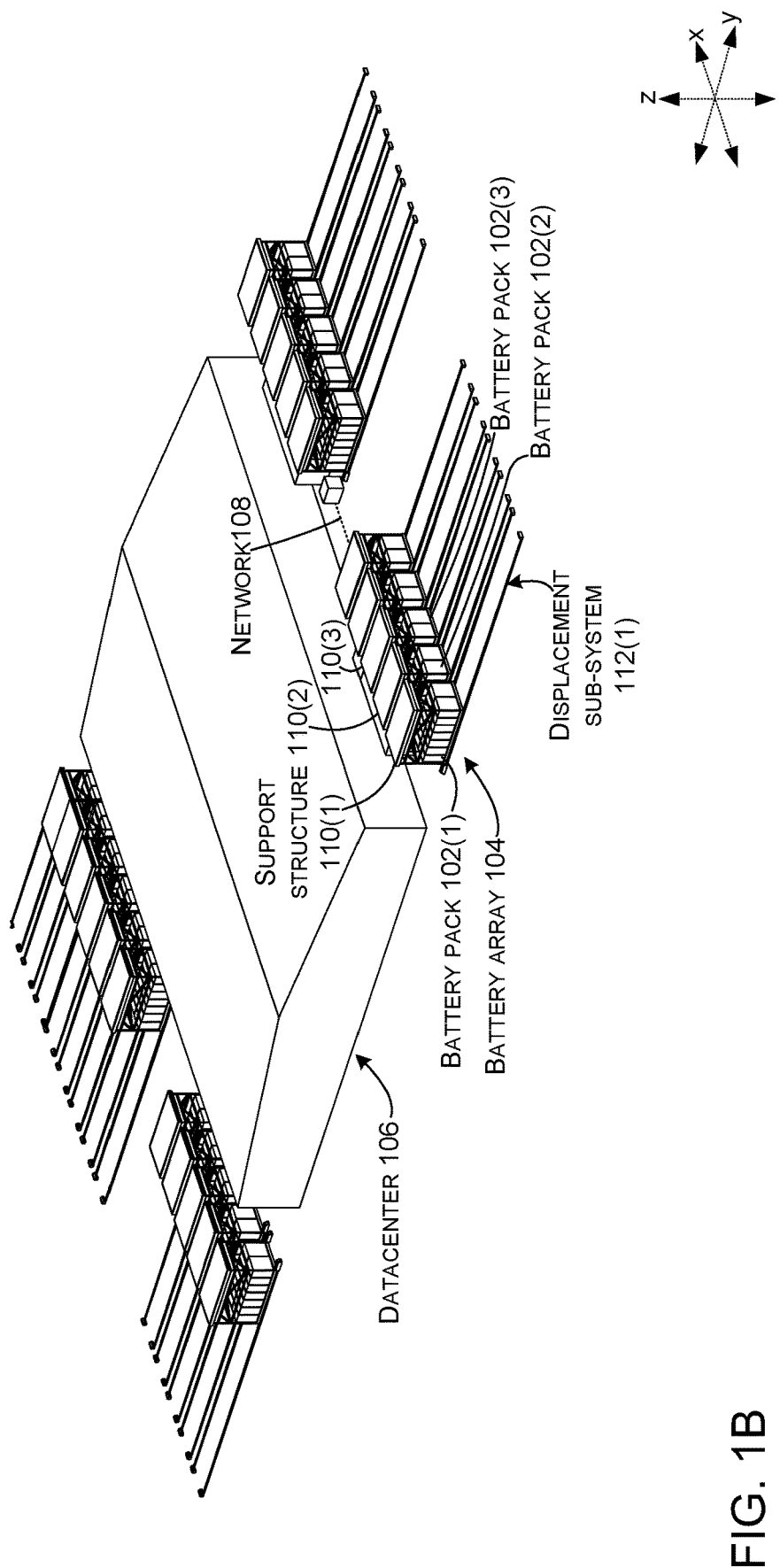
Figure 1C:
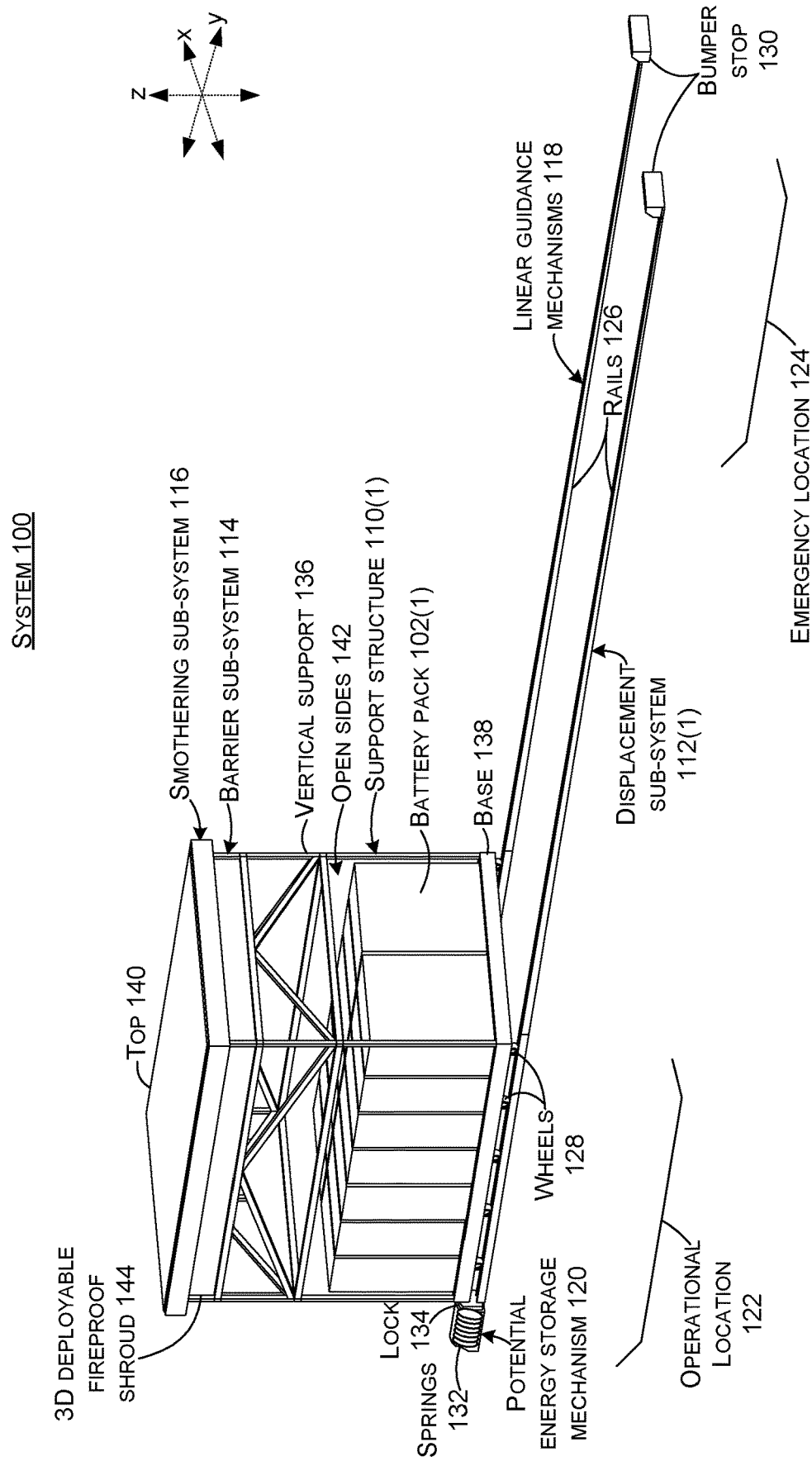

FIGS. 1C-1H show a single battery pack 102(1) in isolation to allow more details to be visualized than in FIGS. 1A and 1B. The description relating to battery pack 102(1) applies to the other battery packs 102. As shown in FIG. 1C, system 100 can include displacement sub-systems 112, barrier sub-systems 114, and smothering sub-systems 116 that are configured to achieve aspects introduced above and/or below. The displacement sub-systems 112 can function to automatically physically displace or move a burning battery pack away from the other battery packs. In this implementation, the displacement sub-systems 112 can include linear guidance mechanisms 118 and/or potential energy storage mechanisms 120.

Figure 1D:
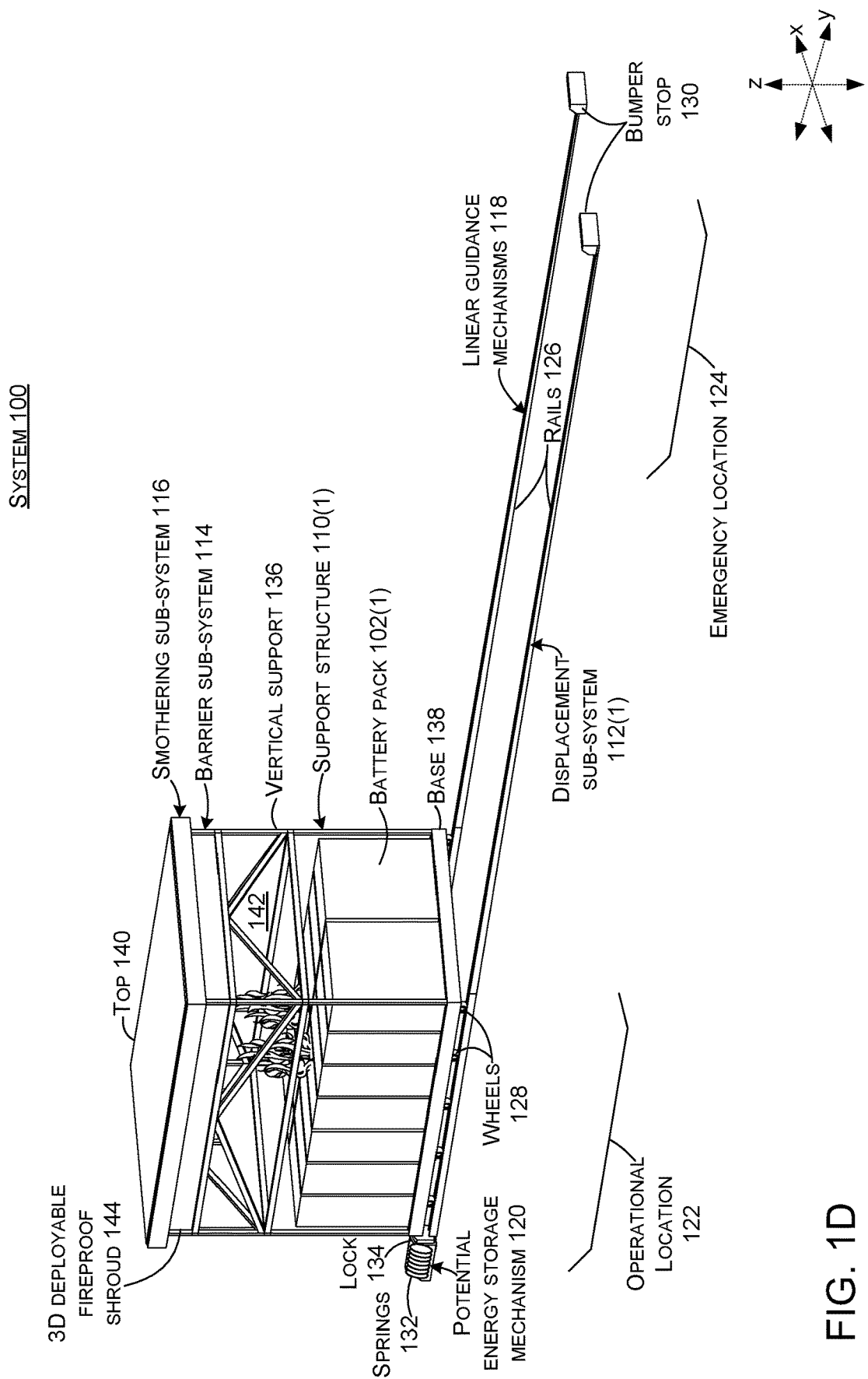
Figure 1E:
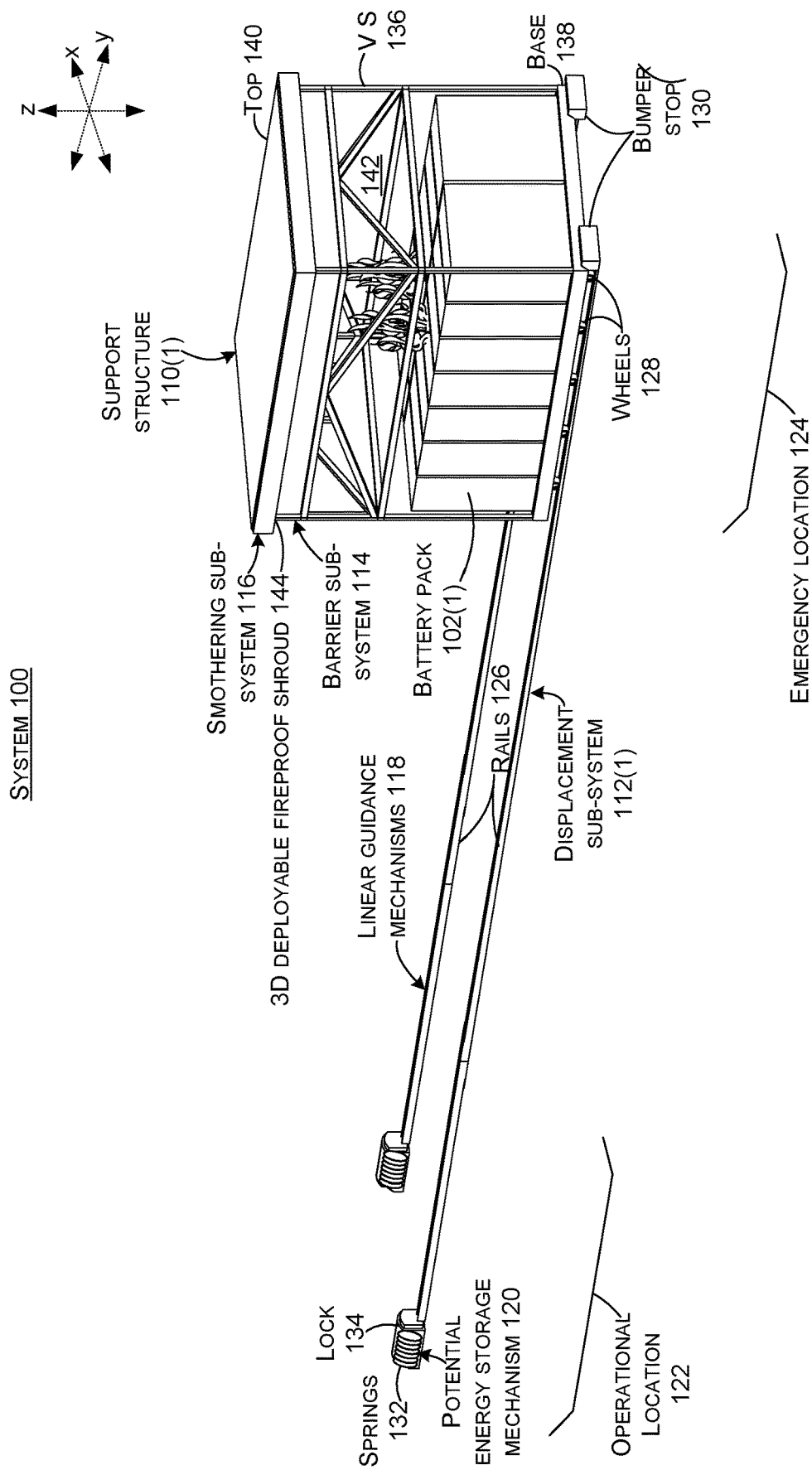

As can be seen in FIGS. 1C-1E, in the event of a fire, the linear guidance mechanisms 118 can function to control the direction and/or distance that burning battery pack 102(1) is moved away from the other battery packs from a normal or operational location 122 to an emergency location 124. In the illustrated example, the linear guidance mechanism 118 can include rails 126 positioned on or in the ground and wheels 128 positioned on the support structure 110 holding the battery pack 102(1) that is burning. The rails 126 can run from the operational location 122 of the battery pack 102(1) and associated support structure 110(1) and extend away from the battery array 104 to buffer stop or bumper post 130 at the emergency location 124.

In an alternative configuration, the linear guidance mechanism 118 can be manifest as grooves or channels in the surface of the ground that wheels 128 roll in. The channels or the rails (when flush mounted to the surface of the ground) have minimal impact on normal operations and maintenance of the system 100. For instance, service vehicles can drive over the channels or rails in a normal manner, such as to approach the battery packs 102 for maintenance. Thus, the displacement sub-system 112 can have very little effect on the footprint of the system 100 or operations of the system under normal conditions.

In some cases, the displacement sub-system 112 can include an electric motor or other mechanism (not shown) to move individual battery packs 102 and associated support structures 110 in the case of a fire. In other cases, potential energy storage mechanism 120 may store energy so that no energy input is needed during the fire. For instance, potential energy storage mechanism 120 can be manifest as a spring 132 that is compressed when the battery pack 102(1) and associated support structure 110(1) are positioned in their normal or operational location 122. A lock 134 can hold the battery pack 102(1) and support structure 110(1) in place with the springs 132 in the compressed state biased against the support structure.

FIG. 1C shows the battery pack 102(1) at the operational location 122 during normal operating conditions. FIG. 1D shows a subsequent point where a fire is breaking out on battery pack 102(1). To address the fire, the displacement sub-system 112(1) can move the burning battery pack 102(1) along a path away from the rest of the battery array 104 (FIG. 1A). In this case, the lock 134 can be released and the stored potential energy from the springs 132 can move the battery pack 102(1) and support structure 110(1) linearly away from the other battery packs 102 (e.g., remainder of the array of battery packs).

Alternatively or additionally, the rails 126 can slope slightly away (e.g., downward) from the operational location 122 so that if the lock 134 is released, the battery pack 102(1) and associated support structure 110(1) roll from the operational location 122 to the emergency location 124. Thus, the operational location 122 of the battery pack 102(1) and associated support structure 110(1) is higher than the emergency location 124 and, when allowed, the battery pack and associated support structure will roll under the influence of gravity from the operational location 122 to the emergency location 124 without inputting external energy.

In these fire scenarios, the lock 134 could be automatically released to move the battery pack 102(1) and support structure 110(1) away from other battery packs 102 of the battery array 104 and/or other structures, such as datacenter 106. In such a case, various sensors (not shown) may be employed to ensure that the rails 126 are clear. For instance, a heat sensor (shown in FIG. 2A) positioned on the battery pack 102 may detect temperatures indicative of a fire and send a signal to the lock 134 to unlock and release the battery pack 102(1) and support structure 110(1). However, if other sensors detect objects or people on the rails 126, the signals from these other sensors can prevent the lock 134 from unlocking. Alternatively or additionally, the lock 134 can also be controlled by human input. For instance, the lock 134 may remain locked unless an unlock signal is received from on-site personnel, such as technicians and/or firefighters who can ascertain the safety of moving the burning battery pack 102(1) and support structure 110(1).

The discussion above explains a technical solution offered by the displacement sub-system 112(1) that can automatically physically move a burning battery pack away from other battery packs to reduce fire spread.

Returning to FIG. 1C, the example support structure 110(1) is now discussed in more detail. In some implementations, the support structures 110 can have vertical supports 136 extending between a base 138 and a covered top 140. The vertical supports 136 can allow for open sides 142. The open sides can facilitate servicing the battery packs 102. The covered top 140 can protect the battery pack 102(1) from sun and rain.

The following discussion continues with FIG. 1C and relates to the barrier sub-systems 114. The barrier sub-systems 114 can reduce fire spread by positioning a fire proof barrier around the battery pack 102(1). The barrier sub-system can be used alone to reduce fire spread or in conjunction with the displacement sub-system 112(1) and/or the smothering sub-system 116.

Figure 1F:
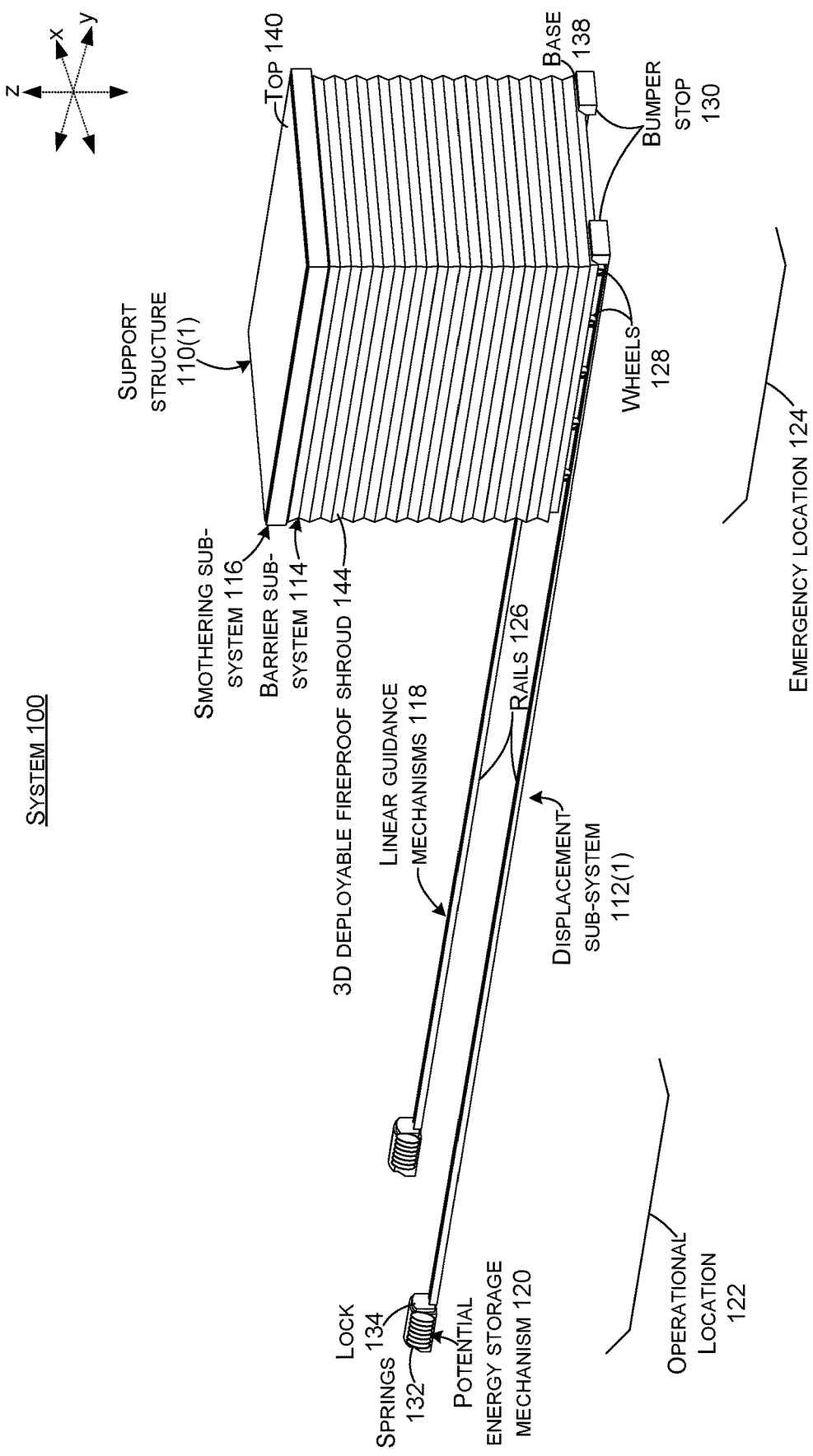

In this implementation, the barrier sub-systems 114 are associated with the support structures 110. The barrier sub-systems 114 can include three-dimensional (3D) deployable fireproof shrouds 144 that are associated with support structures 110. The 3D deployable fireproof shroud 144 can be integrated with or include the covered top 140. Under normal operating conditions, such as shown in FIG. 1C, the 3D deployable fireproof shrouds 144 can have an unobtrusive storage or stored configuration. If a fire occurs on the battery pack, such as depicted on FIG. 1E, the 3D deployable fireproof shroud 144 can be released and can assume a deployed configuration as shown in FIG. 1F.

The 3D deployable fireproof shroud 144 can be configured to automatically deploy along vertical sides of the support structure when a fire occurs on the battery pack, among other scenarios. The 3D deployable fireproof shroud can form a physical barrier to fire spread, either into, or out of the battery pack 102.

The 3D deployable fireproof shroud 144 can be formed from metal, a fire-proof fabric, composite, or other suitable materials. Example fire-proof fabrics can be made from aramid fibers, among others. Other example fire-proof fabrics can include carbon felt and fiberglass, among others. The 3D deployable fireproof shroud can be stored rolled or folded, among other configurations. The 3D deployable fireproof shroud could be stored exposed or could be stored in an enclosure, such as the underside of the top 140. The 3D deployable fireproof shroud 144 can be retained in the stored configuration by one or more types of retainers, which are illustrated and described below relative to FIG. 5A. For instance, fusible links provide one type of retainer that would melt if a fire occurred on the battery pack and automatically release the 3D deployable fireproof shroud. For example, heat from the fire would melt the fusible links and automatically release the 3D deployable fireproof shroud.

In some implementations such as illustrated in FIG. 1 F, the 3D deployable fireproof shroud 144 can be a single element that deploys along the outside of the vertical supports 136 of FIG. 1E (e.g., around the perimeter of the support structure 110(1)). The 3D deployable fireproof shroud 144, operating collectively with the base 138 and the top 140 can limit air flow into and out of the support structure 110(1) and in some configurations can create an airtight seal around the battery pack 102. The airtight seal can reduce oxygen availability to the battery pack and hence retard burning of the battery pack.

In other implementations, the 3D deployable fireproof shroud 144 can operate in concert with the support structure 110(1) to create an airtight seal. Such an example is described below relative to FIGS. 5A-5C. For instance, the vertical supports 136 may include opposing 'C' shaped channel material, such as channel steel. Similarly, the base could include upwardly facing C-shaped material, such as channel steel. The 3D deployable fireproof shroud can deploy down the opposing vertical channel and land in the upward facing base channel. This configuration can limit air flow into and out of the support structure 110 and in some configurations can create an airtight seal around the battery pack 102.

These implementations can provide a technical solution to limit fire damage in the battery array 104. Under normal operating conditions, the 3D deployable fireproof shroud 144 does not interfere with normal operations and/or maintenance. For instance, the sides 142 of the support structure 110(1) are mostly open to allow easy access to the battery pack 102(1). During a fire, the 3D deployable fireproof shroud 144 can deploy (e.g., drop) to fully encapsulate the battery pack 102(1) and prevent the fire from spreading to the rest of the battery array 104. Thus, the technical solution provided by the 3D deployable fireproof shroud 144 provides fire security as though the battery pack 102 was positioned in a fire proof container, but offers the convenience of a more open and accessible battery pack unless a fire occurs.

Existing fire dampers are used to separate a fire within one area from spreading to an adjacent area, and are designed in a single vertical plane. The present concepts provide a technical solution to physically encapsulate and isolate a fire on all sides, thus, preventing the spread to adjacent areas and equipment. Further, by completely encapsulating the fire with the 3D deployable fireproof shroud 144, the present concepts can limit airflow around the battery pack 102(1) (e.g., between the interior and exterior of the support structure 110(1)).

The description now focuses on the smothering sub-system 116. The smothering sub-system 116 can be employed alone or in combination with the displacement sub-system 112 and/or the barrier sub-system 114. The smothering sub-system 116 can unobtrusively store a large volume of non-combustible smothering media 146 (hereinafter, 'smothering media') above the battery pack. In this example, the smothering sub-system 116 stores the non-combustible smothering media 146 in a volume or media reservoir that is partially defined by the top 140. Further details regarding media storage are described below relative to FIGS. 2A-2C, 3A-3B, and 4A-4B.

Various types of smothering media 146 can be employed. Some implementations can utilize granular media, such as sand, mineral soil, etc. Any media that is non-combustible, tends to remain flowable over time, and/or has properties that tend to act as a fire suppressant can be employed. Suitable smothering media can reduce fire growth and potentially extinguish the fire by cooling the burning battery pack proximate to the fire, limiting oxygen availability at the fire, and/or limiting fuel availability at the fire.

Figure 1G:
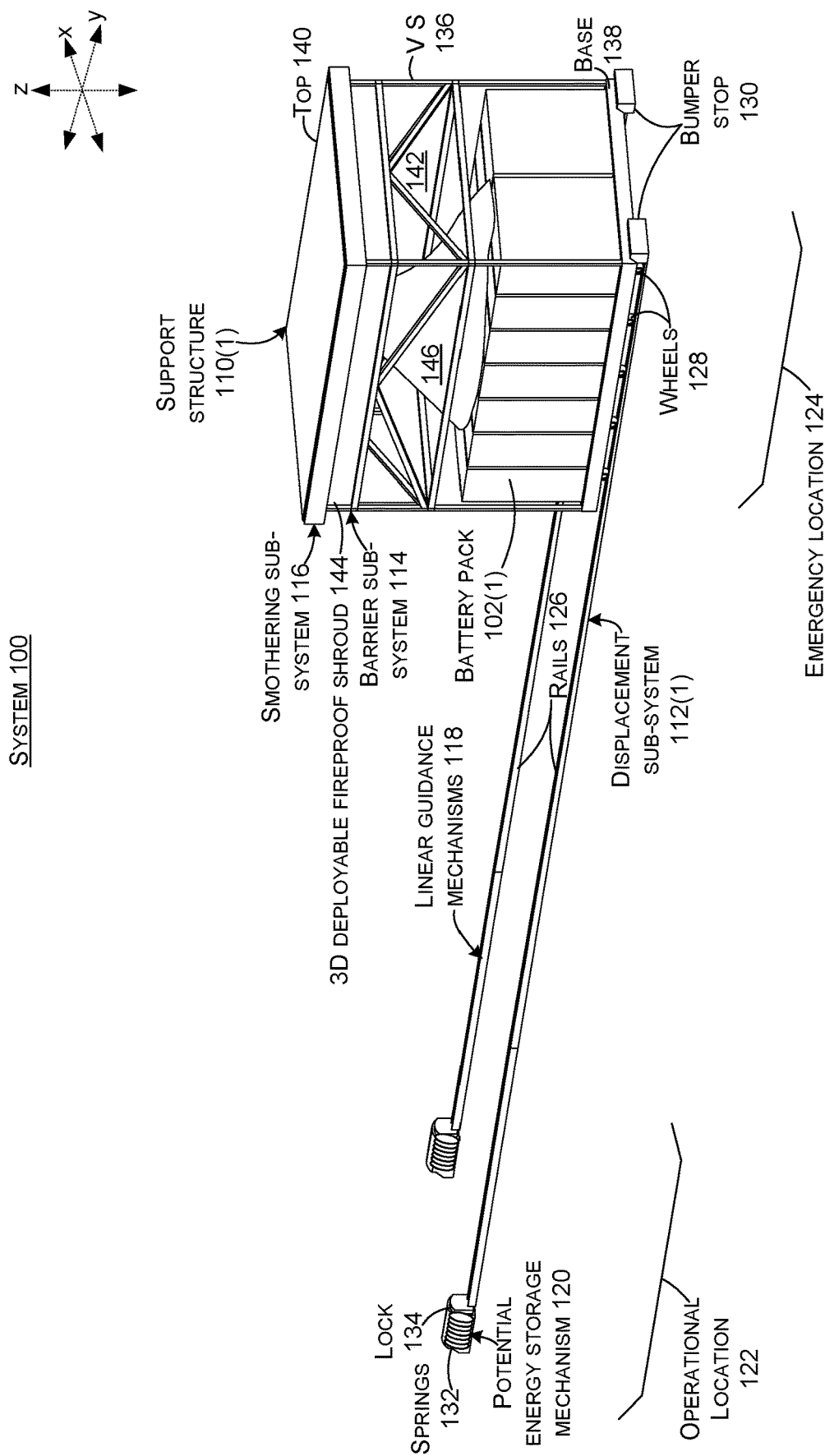
Figure 1H:
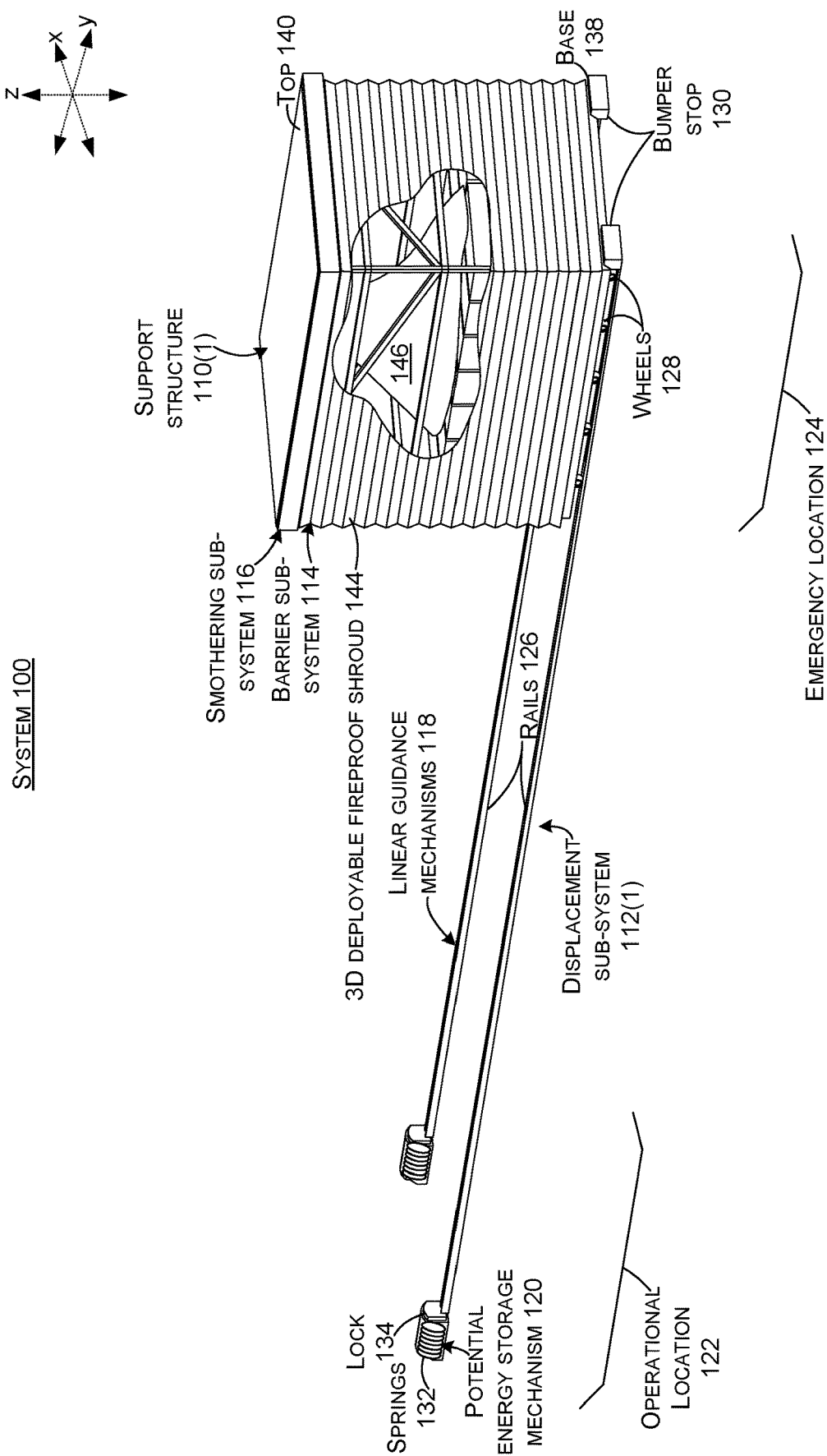

During normal operation, the smothering sub-system 116 does not interfere with battery pack operation or maintenance as represented by FIG. 1C. If a fire occurs on the battery pack 102(1) as represented in FIGS. 1D and 1E, the smothering sub-system 116 can automatically release or dispense the non-combustible smothering media 146 to smother and/or cool the fire as indicated in FIG. 1G. As mentioned above, the smothering sub-system 116 can operate cooperatively with the barrier sub-system 114 as illustrated in FIG. 1H where a portion of the deployed 3D deployable shroud 144 is shown cut-away to reveal the underlying smothering media 146 on the battery pack 102(1). The 3D deployable shroud 144 may help to retain the smothering media 146 on and around the battery pack 102(1). Other example smothering sub-systems are described below relative to FIGS. 2A-C, 3A-3B, and 4A-4B.

Further, because gravity causes the smothering media 146 to fall on the fire without any propulsion system, the media and the smothering sub-system 116 can last indefinitely (e.g., for the life of the battery pack). There is no need to periodically replace or test the media and no need to check and replace a propellant. Thus, the present concepts provide a technical solution of an ultra-reliable media extinguishing system that is inherently more reliable than existing fire extinguishing solutions.

The discussion above relative to FIGS. 1A-1H show how the displacement sub-system 112, the barrier sub-system 114, and the smothering sub-system 116 can be used in a complementary manner to limit fire spread between battery packs. The discussion below focuses on details of individual sub-systems.

Figure 2A:
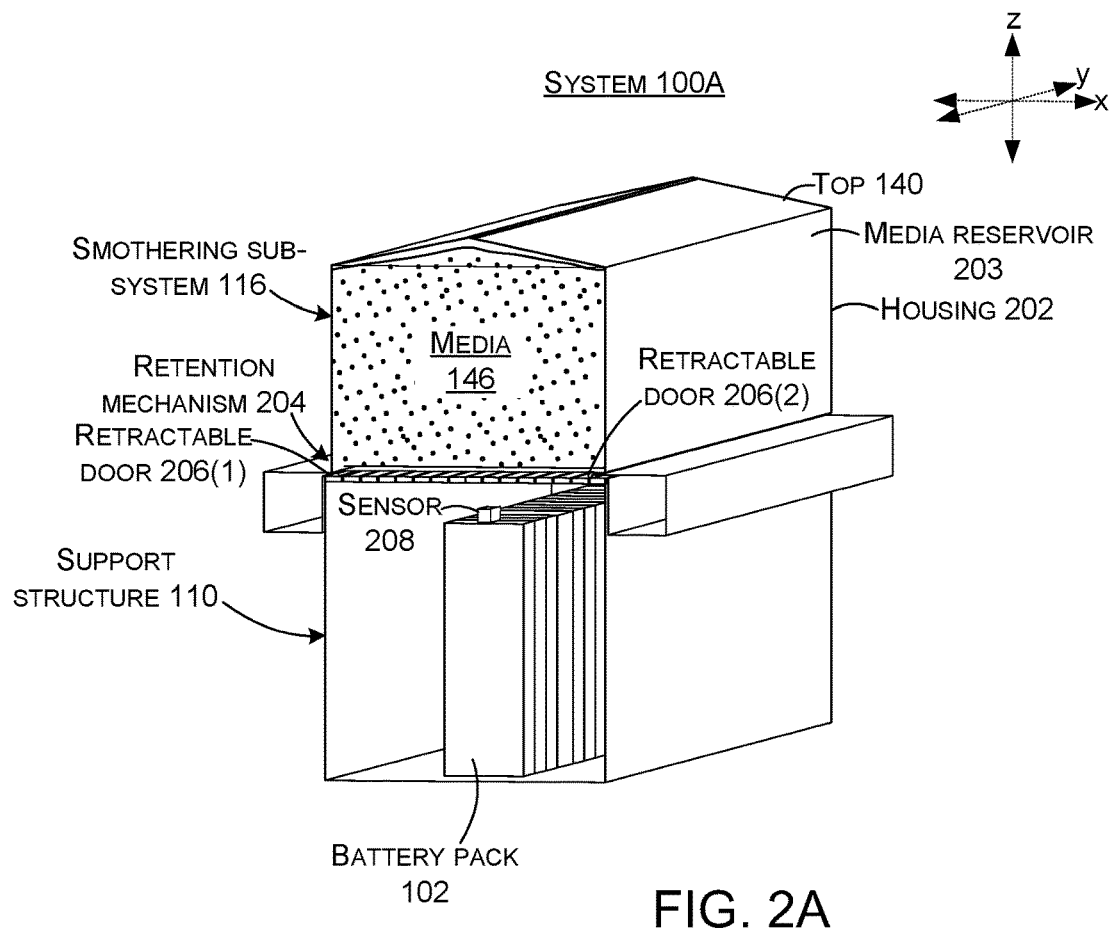
Figure 2B:
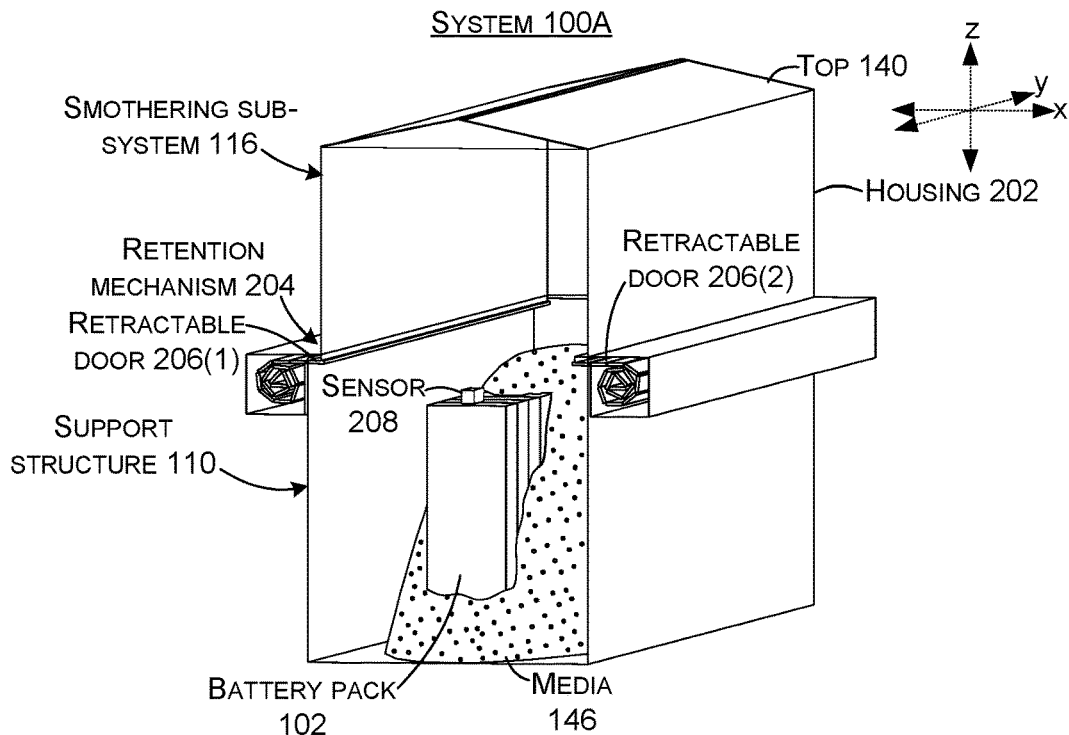
Figure 2C:
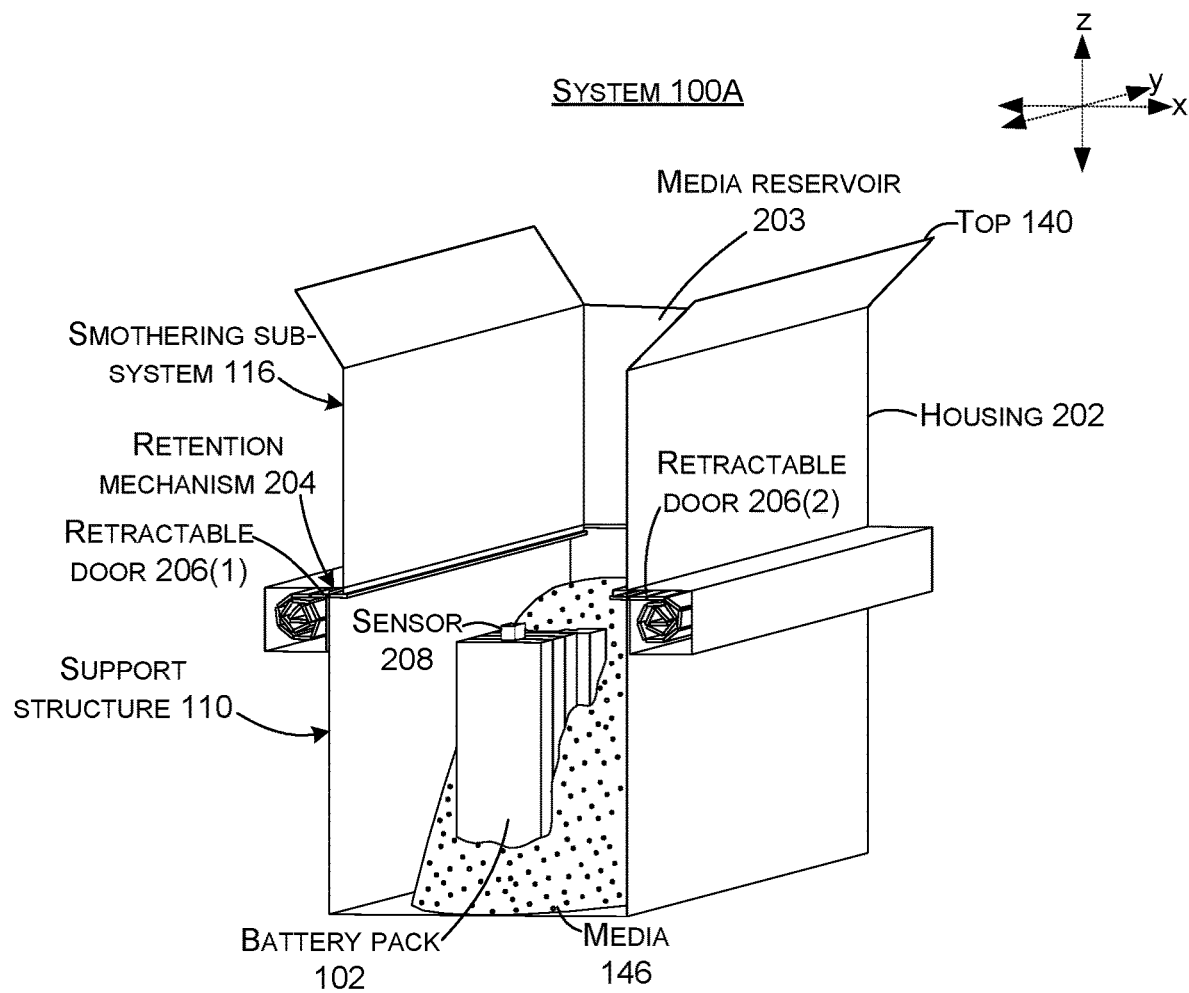

FIGS. 2A-2C collectively show another system 100A. In this case, smothering sub-system 116 can include a housing 202 that is positioned over the support structure 110 that contains the battery pack 102. The housing 202 can define a storage volume or media reservoir 203 for storing media 146. In this implementation, the housing 202 can define the top 140 and the top can function as a roof. Further, the top 140 can be sloped so that water does not pool on the roof. Also, in this implementation, the top can be hinged to create an access point to add more media to the media reservoir 203.

A retention mechanism 204 can separate the storage volume of the media reservoir 203 from the interior of the support structure 110 under normal operating conditions. In this case, the retention mechanism 204 is manifest as first and second opposing retractable doors 206. Other configurations are described below relative to FIGS. 3A-3B and 4A-4B.

In the present example, as shown in FIG. 2B, if a fire is detected on the battery pack 102, such as by a sensor 208, the first and second opposing retractable doors 206 can be retracted to allow the non-combustible smothering media 146 to fall onto and at least partially cover the battery pack 102. In some configurations, the volume of housing 202 can be sufficient to completely cover the battery pack 102 with media 146.

FIG. 2C shows how the hinged top 140 can be opened to add more media 146 to the media reservoir 203, whether during a fire or to initially set up the smothering sub-system 116. Note that in many battery array applications, real estate at the facility (e.g., square feet) is limited. However, the height (in the z reference direction) or space above the battery packs tends to be under-utilized. Thus, the present implementations, can leverage this unused space to increase the volume of the media reservoir 203 without increasing the xy footprint of the battery pack 102 or support structure 110. This technical solution allows for smothering media 146 to be selected for properties, such as stability and cost, rather than volume or efficiency.

For instance, the media reservoir 203 could hold a relatively large volume, such as 10 cubic yards, for example. This large volume can allow a large volume of a relatively inexpensive smothering media 146, such as sand to be employed. The large volume of relatively inexpensive smothering media could provide relatively high performance (e.g., effective at limiting/extinguishing the fire) and be relatively inexpensive compared to other fire suppression solutions (e.g., the cost of the media reservoir and the sand is less than traditional pressurized fire retardant systems). Further, the maintenance costs of the smothering media solutions can be substantially less than traditional systems over the lifespan of the battery packs and the effective lifespan of the smothering media solution can be longer than traditional systems.

FIGS. 3A and 3B collectively show another example system 100B. In this case, the retention mechanism 204 is manifest as clamshell doors 302. In the illustrated implementation, four pairs of parallel (along their long axis (e.g., y reference axis)) clamshell doors 302(1)-302(4) are employed. However, other implementations can employ any number of clamshell doors 302. In this case, each pair of clamshell doors is held together in a closed position by a fusible link 304. Thus, as shown in FIG. 3A, during normal operation, the clamshell doors remain closed and hold the media 146 in the media reservoir 203 provided by housing 202 above the support structure 110.

As shown in FIG. 3B, in the event of a fire on the battery pack 102, the heat can break the fusible links 304. Degradation of the fusible links allows the clamshell doors 302 to be forced open by the weight of the media 146. The media 146 can then flow down onto the battery pack 102. Thus, the fusible links 304 can automatically dispense the media 146 onto the fire without any external input, such as from sensors or motors. Thus, system 100B can limit fire growth and potentially extinguish the fire even in a complete power outage. As mentioned above relative to FIGS. 2A-2C, the height of the housing 202 can be selected to allow the media reservoir 203 to be any desired volume. For instance, the volume of the media reservoir could be equivalent to the unoccupied volume of the support structure 110 (e.g., the volume of the support structure minus the volume of the battery pack 102).

FIGS. 4A and 4B collectively show another example system 100C. In this case, the retention mechanism 204 is manifest as a combustible floor 402 supported by structural members 404. As shown in FIG. 4A, during normal operation, the combustible floor 402 supports the media 146 in the housing 202 above the support structure 110.

As shown in FIG. 4B, in the event of a fire on the battery pack 102, the heat can burn or melt the combustible floor 402. Degradation of the combustible floor 402 by burning or melting reduces its ability to support the media 146. The media 146 can then flow down onto the battery pack 102. Thus, the combustible floor 402 can automatically dispense the media 146 onto the fire without any external input, such as from sensors or motors. As such, system 100C can limit fire growth and potentially extinguish the fire even in a complete power outage.

Figure 5A:
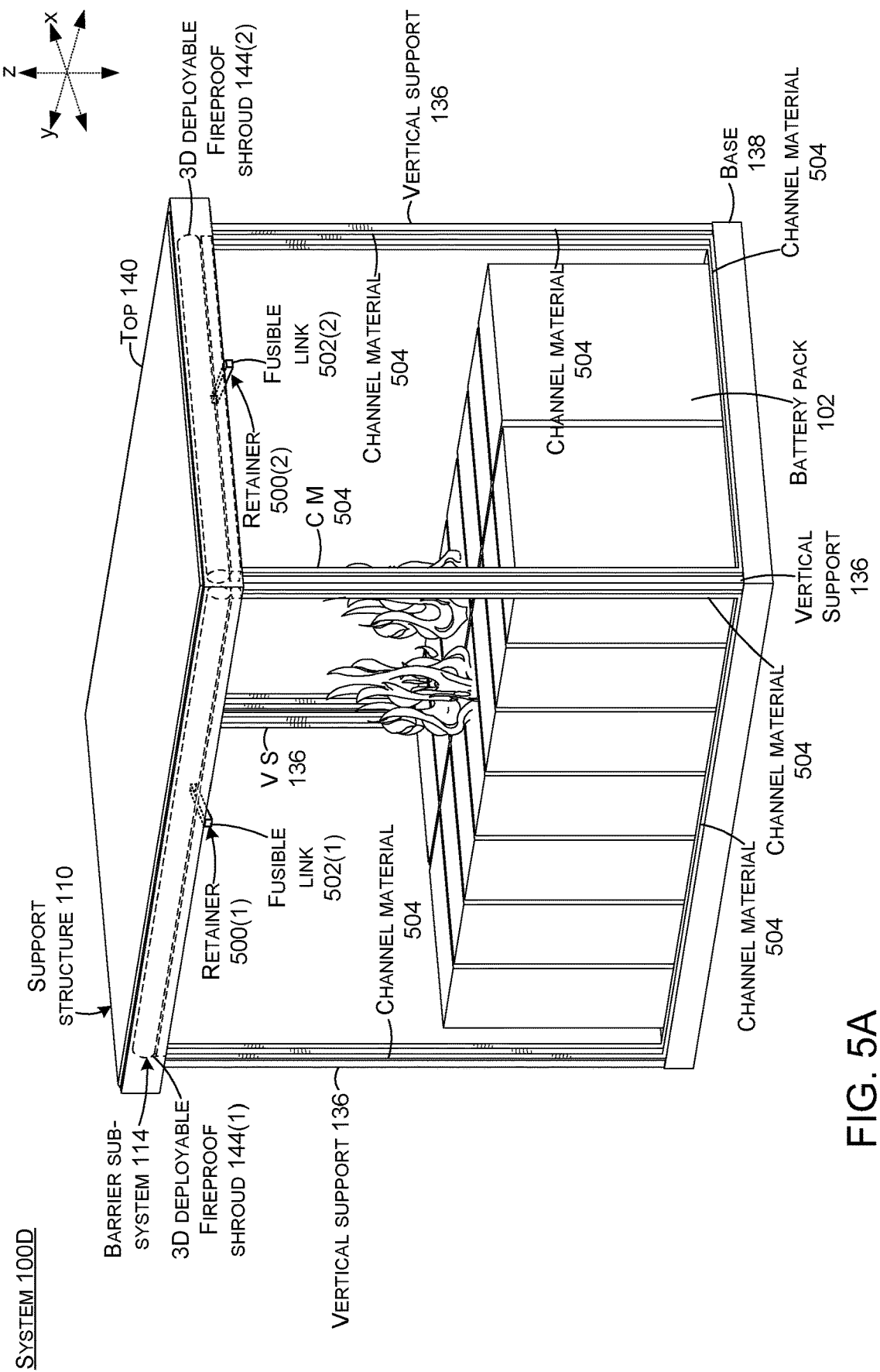
Figure 5B:
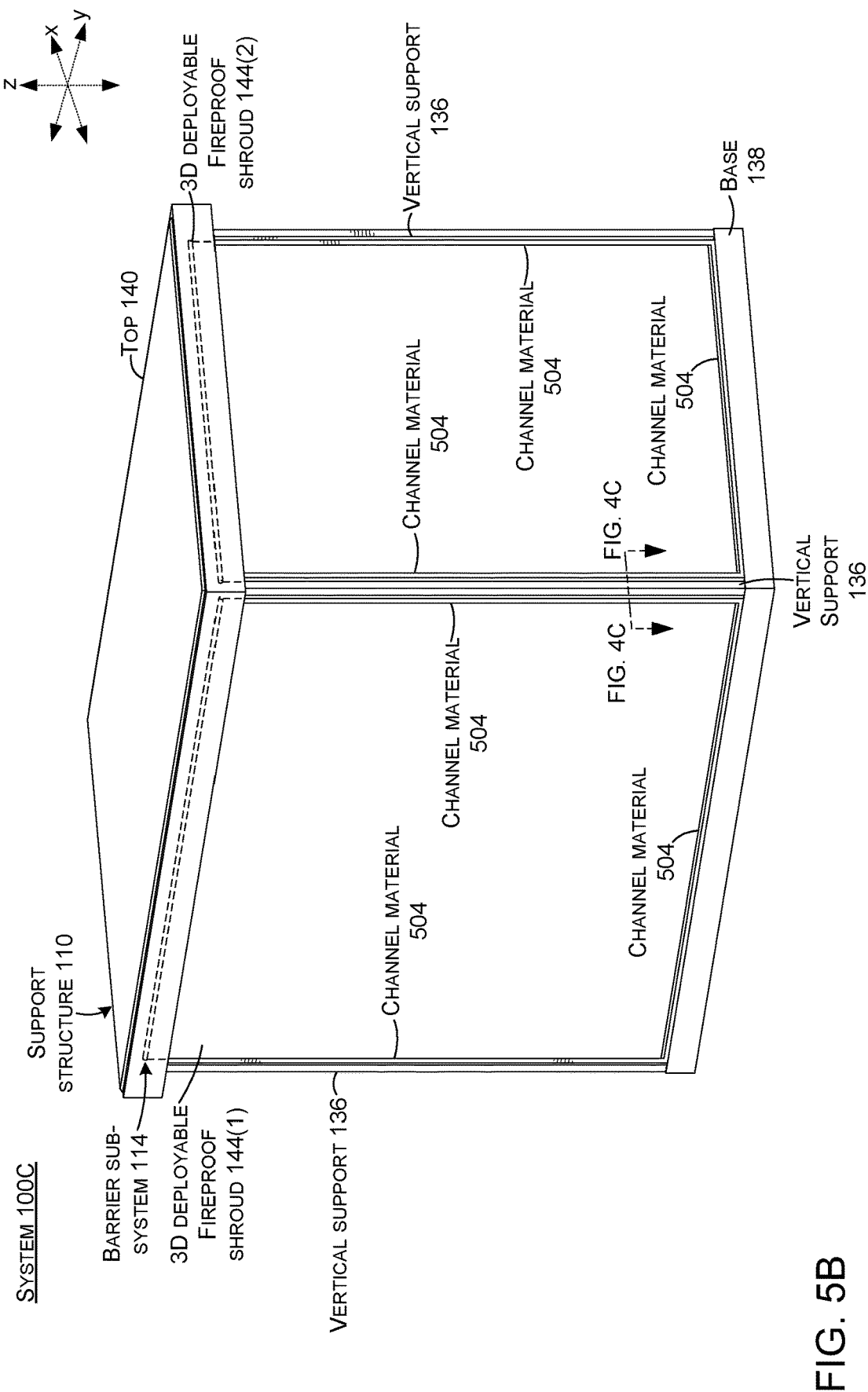

FIGS. 5A and 5B collectively show another example system 100D that includes a barrier sub-system 114. In this implementation, the barrier sub-system 114 includes four 3D deployable shrouds 144. There can be 3D deployable shrouds on each vertical side of the support structure 110, but only 3D deployable shrouds 144(1) and 144(2) are shown in the drawings because the other two are facing away from the reader. These two 3D deployable shrouds 144(1) and 144(2) are shown in ghost to indicate that they would be obscured from view by the top 140 in the stowed or storage configuration of FIG. 5A.

The 3D deployable shrouds 144 are stored in rolled configurations under the top 140 (e.g., the top 140 protects the 3D deployable shrouds 144 when they are stored). Retainers 500 can maintain the 3D deployable shrouds 144 in the storage configuration in upper regions of the support structures 110 during normal operation. In this example, the retainers 500 can be manifest as fusible links 502. The fusible links 502 can be secured to the top 140 and can extend below the 3D deployable shrouds 144 to prevent them from unrolling (e.g., deploying).

If a fire breaks out on the battery pack 102 as illustrated on FIG. 5A, the heat from the fire can melt the fusible links 502. The melting fusible links 502 lose their integrity and allow the 3D deployable shrouds 144 to deploy as indicated in FIG. 5B. In this implementation, the 3D deployable shrouds 144 can work in concert with the support structure 110 to isolate the fire and potentially to create an airtight seal between the interior and the exterior of the support structure. In this case, the vertical supports 136 and the base 138 can include channel material 504, such as steel, that has an open side facing toward the 3D deployable shrouds 144.

Figure 5C:
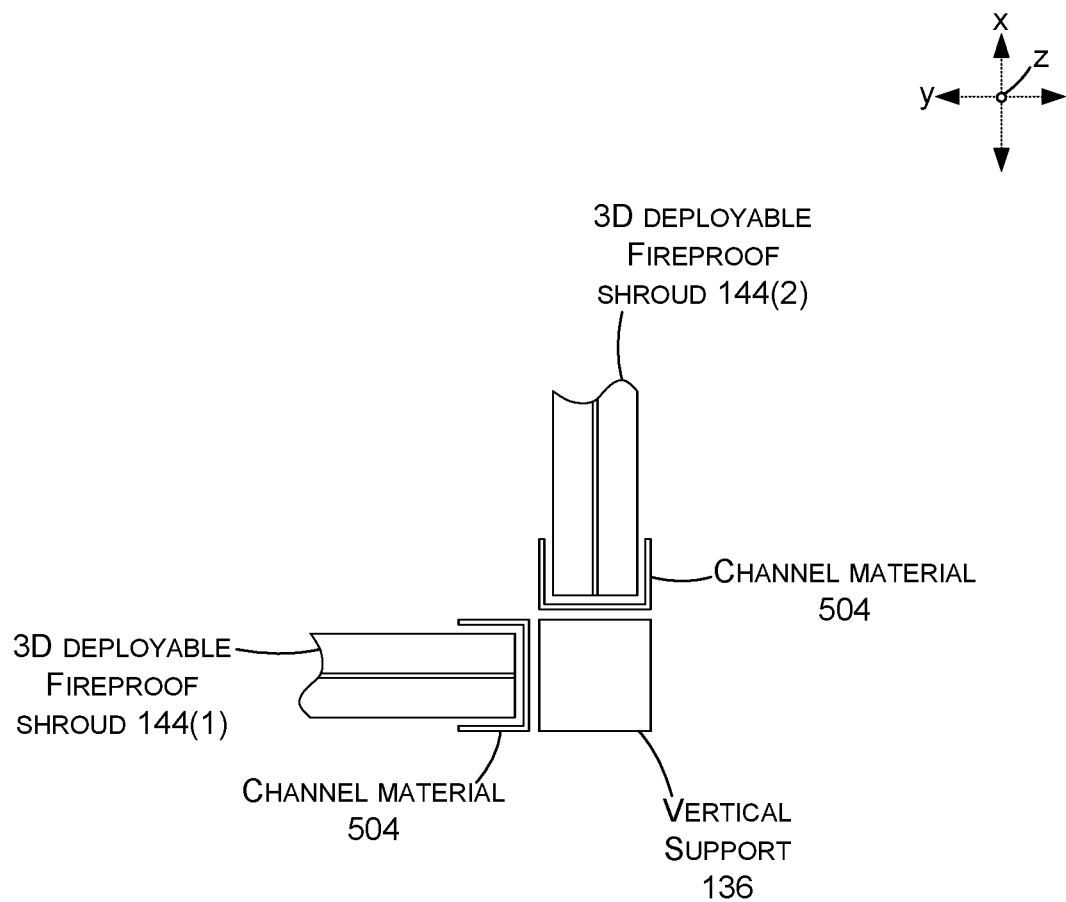
FIG. 5C shows a sectional view of example components in accordance with some implementations of the present concepts.

When deployed, the 3D deployable shrouds 144 can slide down the vertical channel material 504. FIG. 5C shows the interrelationship of the 3D deployable shrouds 144 and the vertical channel material 504 associated with vertical support 136. The descending 3D deployable shrouds 144 can come to rest in the upward facing horizontal channel material 504 of the base 138. Thus, collectively, 3D deployable shrouds 144, the base 138 with its horizontal channel material 504, the vertical supports 136 and their vertical channel material 504, and the top 140 can collectively contribute to low air exchange and potentially an airtight seal between the interior and exterior of the support structure 110 during a fire.

Other types of retainers 500, such as clutches and plungers, among others, are contemplated. Alternatively or additionally to the retainers being locally controlled by the heat of the fire, the retainers 500 can be remotely controlled to release the 3D deployable fireproof shroud 144. For instance, if a fire is detected on a first battery pack, the fusible links on the 3D deployable fireproof shroud belonging to that battery pack may automatically deploy the 3D deployable fireproof shroud. Fusible links 502 on other barrier sub-systems 114 could be remotely activated with an electrical current sufficient to break the link.

In one such case, facility management software and/or site technicians may decide to deploy the 3D deployable fireproof shrouds 144 on an adjacent battery pack 102 to provide that adjacent battery pack with additional protection from various deleterious conditions including, but not limited to fire. In such a case, the retainer 500 on the adjacent battery pack 102 may be activated to release its 3D deployable fireproof shroud 144.

Note that various types of retainers 500 can be configured to be activated locally and remotely. For instance, a temperature sensor could be positioned on, or relative to, the battery pack as shown on FIG. 2A, and the output of the temperature sensor could be connected to the retainer 500. If the temperature sensor senses a temperature that exceeds a threshold temperature, then the retainer can automatically release the 3D deployable fireproof shroud 144. Alternatively or additionally, a signal can be sent from a facility operations control room to activate the retainers 500 responsive to an event, such as a fire at the facility. These configurations provide systems that under normal operating conditions have the same footprint and serviceability as existing battery arrays, but in the event of a fire, offers one or more technical solutions for reducing fire damage through physical distancing, deploying fire barriers, and/or smothering the fire with non-combustible media positioned above the battery packs.

The components described above can be manufactured from components having suitable properties, such as fire resistance properties and structural properties, among others. Various methods of manufacture, assembly, and/or use for fire control displacement sub-systems, barrier sub-systems, and smothering sub-systems are contemplated beyond those shown above relative to FIGS. 1A-5C.

Various examples are described above. Additional examples are described below. One example includes a system comprising an array of battery packs in physical proximity to one another to store and supply electrical power to an electrical network, and displacement sub-systems associated with individual battery packs, the displacement sub-systems configured to physically separate individual distressed battery packs from the array of battery packs.

Another example can include any of the above and/or below examples where individual battery packs are positioned in battery pack support structures and the displacement sub-systems are configured to physically separate individual distressed battery packs linearly away from a remainder of the array of battery packs.

Another example can include any of the above and/or below examples where the displacement sub-systems comprise potential energy storage mechanisms that are configured to store potential energy to physically separate the individual distressed battery packs during an electrical power outage.

Another example can include any of the above and/or below examples where the potential energy storage mechanism comprises compressed springs that are biased against the battery pack support structures.

Another example can include any of the above and/or below examples where the displacement sub-systems further comprise linear guidance mechanisms configured to control a path of the distressed battery packs away from the remaining battery packs.

Another example can include any of the above and/or below examples where the linear guidance mechanisms comprise rails on a ground surface and wheels on the battery pack support structures.

Another example can include any of the above and/or below examples where the rails are sloped away from the array of battery packs so that the linear guidance mechanisms also function as the potential energy storage mechanisms.

Another example can include a system comprising a battery pack positioned in a battery pack support structure and a three-dimensional (3D) deployable fireproof shroud configured to automatically deploy along vertical sides of the battery pack support structure when a fire occurs on the battery pack.

Another example can include any of the above and/or below examples where the 3D deployable fireproof shroud comprises metal or a fire-proof fabric.

Another example can include any of the above and/or below examples where the 3D deployable fireproof shroud is stored in a rolled or folded configuration prior to being automatically deployed.

Another example can include any of the above and/or below examples where the system further comprises a retainer configured to retain the 3D deployable fireproof shroud at an upper region of the battery pack support structure until activated by the fire.

Another example can include any of the above and/or below examples where the system further comprises a sensor positioned proximate to the battery pack and configured to detect the fire and activate the retainer, or wherein the retainer can be operated remotely to release the 3D deployable fireproof shroud to protect the battery pack from fire that is external to the battery pack.

Another example can include any of the above and/or below examples where the retainer comprises a fusible link.

Another example can include any of the above and/or below examples where the 3D deployable fireproof shroud when deployed is configured to complete an airtight seal between an interior of the battery pack support structure and an exterior of the battery pack support structure.

Another example can include any of the above and/or below examples where the 3D deployable fireproof shroud is configured to be deployed to protect the battery pack when fire or other deleterious conditions are detected outside of the battery pack support structure.

Another example can include a system comprising a battery pack positioned in a battery pack support structure, a media reservoir positioned over the battery pack support structure and configured to hold non-combustible smothering media, and a retention mechanism interposed between the battery pack and the media reservoir and configured to automatically release the non-combustible smothering media into the battery pack support structure when the battery pack experiences a fire.

Another example can include any of the above and/or below examples where the non-combustible smothering media comprises a granular media.

Another example can include any of the above and/or below examples where the retention mechanism comprises retractable doors, clamshell doors, or a combustible floor.

Another example can include any of the above and/or below examples where the clamshell doors are maintained in a closed position by a fusible link.

Another example can include any of the above and/or below examples where the clamshell doors comprise multiple parallel clamshell doors.

Although techniques, methods, devices, systems, etc., pertaining to battery fire control are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A system, comprising:
    a battery pack positioned in a battery pack support structure;
    a media reservoir positioned over the battery pack support structure and configured to hold non-combustible smothering media;
    a smothering sub-system interposed between the battery pack and the media reservoir and configured to automatically release the non-combustible smothering media into the battery pack support structure when the battery pack experiences a fire; and
    a displacement sub-system configured to automatically displace the battery pack away from other flammable objects when the battery pack experiences the fire.

2. The system of claim 1, wherein the non-combustible smothering media comprises a granular media.

3. The system of claim 1, wherein the smothering sub-system comprises a retention mechanism having retractable doors, clamshell doors, or a combustible floor.

4. The system of claim 1, wherein the smothering sub-system comprises a retention mechanism having clamshell doors that are maintained in a closed position by a fusible link.

5. The system of claim 4, wherein the clamshell doors comprise multiple parallel clamshell doors.

6. The system of claim 1, the other flammable objects comprising other battery packs having respective media reservoirs and smothering sub-systems.

7. The system of claim 1, wherein the displacement sub-system comprises a potential energy storage mechanism that is configured to store potential energy to physically separate the battery pack from the other flammable objects.

8. The system of claim 7, wherein the potential energy storage mechanism is operable during an electrical power outage.

9. The system of claim 7, wherein the potential energy storage mechanism comprises a spring.

10. The system of claim 9, wherein the spring is in a compressed state prior to automatically displacing the battery pack.

11. The system of claim 10, further comprising a lock configured to release the spring from the compressed state.

12. The system of claim 11, further comprising a sensor configured to detect the fire and send a signal that causes the lock to release responsive to detecting the fire.

13. The system of claim 12, the sensor being a heat sensor.

14. The system of claim 11, further comprising a guidance mechanism configured to guide the battery pack in a particular direction away from the other flammable objects.

15. The system of claim 14, the guidance mechanism comprising rails.

16. The system of claim 15, the rails sloping away from the other flammable objects.

17. The system of claim 15, further comprising another sensor configured to determine when the rails are obstructed by an object and prevent the lock from releasing the spring when the rails are obstructed.

18. The system of claim 11, wherein the lock is configured to unlock responsive to receiving an unlock signal based on user input from a human.

19. The system of claim 1, the battery pack being a Lithium-Ion battery pack.

20. A system comprising:
an array of Lithium-Ion battery packs having respective battery pack support structures;
respective media reservoirs positioned over the respective battery pack support structures and configured to hold non-combustible smothering media;
smothering sub-systems interposed between the Lithium-Ion battery packs and the respective media reservoirs and configured to automatically release the non-combustible smothering media in response to a fire;
potential energy storage mechanisms configured to automatically displace the Lithium-Ion battery packs away from the array; and
a sensor configured to detect the fire at an individual distressed Lithium-Ion battery pack and cause a corresponding potential energy storage mechanism to release, resulting in movement of the individual distressed Lithium-Ion battery pack away from a remainder of the Lithium-Ion battery packs of the array.

* * * * *